(12) United States Patent
Lee et al.

(10) Patent No.: US 12,483,765 B2
(45) Date of Patent: Nov. 25, 2025

(54) IMAGE ACQUISITION METHOD AND DEVICE

(71) Applicant: AUROS TECHNOLOGY, INC., Hwaseong-si (KR)

(72) Inventors: Seung Soo Lee, Osan-si (KR); Jin Suk Park, Osan-si (KR); So Young Hwang, Hwaseong-si (KR)

(73) Assignee: AUROS TECHNOLOGY, INC., Hwaseong-si (KR)

( * ) Notice: Subject to any disclaimer, the term of this patent is extended or adjusted under 35 U.S.C. 154(b) by 80 days.

(21) Appl. No.: 18/502,093

(22) Filed: Nov. 6, 2023

(65) Prior Publication Data

US 2024/0155211 A1    May 9, 2024

(30) Foreign Application Priority Data

Nov. 7, 2022  (KR) .................. 10-2022-0146925
Jan. 30, 2023  (KR) .................. 10-2023-0011513

(51) Int. Cl.
  *H04N 23/11*   (2023.01)
  *G01B 11/27*   (2006.01)
  (Continued)

(52) U.S. Cl.
  CPC ........... *H04N 23/11* (2023.01); *G01B 11/272* (2013.01); *G02B 27/108* (2013.01);
  (Continued)

(58) Field of Classification Search
  CPC ...... H04N 23/11; H04N 23/56; H04N 23/673; G01B 11/272; G02B 27/108; G02B 27/141
  See application file for complete search history.

(56) References Cited

U.S. PATENT DOCUMENTS 7,126,681 B1 * 10/2006 Chen .................... G01N 21/956
                                                356/237.4
2011/0075970 A1 * 3/2011 Schrauwen ............... G02B 6/34
                                                385/37
(Continued)

FOREIGN PATENT DOCUMENTS

KR   1019990024983 A   4/1999
KR      100500469 B1   7/2005
(Continued)

*Primary Examiner* — Nasim N Nirjhar
(74) *Attorney, Agent, or Firm* — NKL Law; Jae Youn Kim (57) ABSTRACT

An image acquisition method includes acquiring a first optical signal by emitting a penetrative light beam, which can penetrate a mask layer, to a measurement target mark that is one of marks on a sample, acquiring a second optical signal by emitting a reflective light beam reflecting from the mask layer to the measurement target mark, determining whether the measurement target mark is covered with the mask layer by comparing the first optical signal and the second optical signal, and acquiring a mark image by emitting a first light beam, which penetrates the mask layer, to the measurement target mark when the measurement target mark is covered with the mask layer, and acquiring a mark image by emitting a second light beam different from the first light beam to the measurement target mark when the measurement target mark is not covered with the mask layer.

18 Claims, 9 Drawing Sheets

(51) Int. Cl.
  *G02B 27/10* (2006.01)
  *G02B 27/14* (2006.01)
  *H04N 23/56* (2023.01)
  *H04N 23/67* (2023.01)

(52) U.S. Cl.
  CPC ........... *G02B 27/141* (2013.01); *H04N 23/56* (2023.01); *H04N 23/673* (2023.01)

(56) References Cited

U.S. PATENT DOCUMENTS

2021/0372784 A1  12/2021  Hill et al.
2022/0291143 A1   9/2022  Manassen et al.
2024/0377765 A1*  11/2024  Smorenburg ....... G03F 7/70616

FOREIGN PATENT DOCUMENTS

KR       101852236 B1   4/2018
KR      20180125621 A  11/2018
KR      20220122489 A   9/2022

* cited by examiner

IMAGE ACQUISITION METHOD AND DEVICE

CROSS REFERENCE TO RELATED APPLICATION

The present application claims priority to Korean Patent Applications No. 10-2022-0146925, filed Nov. 7, 2022 and No. 10-2023-0011513, filed Jan. 30, 2023, the entire contents of which are incorporated herein for all purposes by this reference.

BACKGROUND

Technical Field

The present disclosure relates to an image acquisition method and device, which can acquire images while discriminating marks covered with and not covered with a layer having low visible light transmissivity.

Description of the Related Art

Recently, layers having low visible light transmittance and high short wavelength infrared (SWIR) transmittance are increasingly used in semiconductor processes. These layers influence acquisition of an overlay mark image for overlay error measurement or an alignment mark image for wafer alignment in photolithography.

For example, in a complementary metal-oxide semiconductor (CMOS) image sensor (CIS) manufacturing process or a wafer bonding process, a layer having low visible light transmittance such as a silicon layer or a carbon layer may cover overlay marks. Further, in other processes, some overlay marks may be formed with a layer having low visible light transmittance.

Further, in wafer level packaging (WLP) of packing many dies at a time on a wafer, alignment marks exposed in advance on a wafer may be covered with a layer having low visible light transmittance. For example, in steps such as forming of redistribution layers (RDLs) and forming of through silicon via (TSV), alignment marks may be covered with various substance layers having low visible light transmittance.

In this case, there is a problem because it is difficult to acquire a clear image of an overlay mark or an alignment mark using only visible light.

RELATED ART DOCUMENTS

Patent Documents

Document 1: U.S. Patent Application Publication No. US 2022-0291143 A1
Document 2: Korean Patent Application Publication No. KR 10-2018-0125621 A
Document 3: U.S. Patent Application Publication No. US 2021-0372784 A1
Document 4: Korean Patent Application Publication No. 10-1999-0024983
Document 5: Korean Patent No. 10-1852236
Document 6: Korean Patent Application Publication No. 10-2022-0122489
Document 7: Korean Patent No. 10-0500469

SUMMARY

One or more embodiments provide an image acquisition method and device that can be used in a semiconductor process including both a layer having low visible light transmittance and high short wavelength infrared (SWIR) transmittance and a layer having high visible light transmittance.

In one or more embodiments, there is provided an image acquisition method of a plurality of marks, which includes a mark covered with a mask layer, from a sample on which the marks are formed, includes: a) acquiring a first optical signal by emitting a penetrative light beam, which is capable of penetrating a mask layer, to a measurement target mark that is one of the marks on the sample; b) acquiring a second optical signal by emitting a reflective light beam, which reflects from the mask layer, to the measurement target mark; c) determining whether the measurement target mark is covered with the mask layer by comparing the first optical signal and the second optical signal; and d) acquiring a mark image by emitting a first light beam, which penetrates the mask layer, to the measurement target mark when the measurement target mark is covered with the mask layer, and acquiring a mark image by emitting a second light beam, which is different from the first light beam, to the measurement target mark when the measurement target mark is not covered with the mask layer.

The mask layer may be a layer that is opaque for visible light and near infrared light, and the mask layer is a layer that is transparent for short wavelength infrared light.

The mask layer may be a silicon layer or a carbon layer.

The penetrative light beam may be a light beam outside a wavelength band of the second light beam and the reflective light beam may be a light beam outside a wavelength band of the first light beam.

The first light beam may be short wavelength infrared (SWIR)light.

The second light beam may be visible light or near infrared light.

A wavelength band of the first light beam may pertain to 1200~1700 nm.

A wavelength band of the second light beam may pertain to 300~1100 nm.

In the step c), the first optical signal may be an intensity of reflective light by the penetrative light beam and the second optical signal may be an intensity of reflective light by the reflective light beam.

When a ratio of the second optical signal to the first optical signal is a reference value or more, the measurement target mark may be determined to be covered with the mask layer.

The penetrative light beam may be used as a light beam for autofocusing that is used to acquire the mark image using the second light beam, and the reflective light beam may be used as a light beam for autofocusing that is used to acquire the mark image using the first light beam.

The marks may be overlay marks formed on a semiconductor wafer.

The marks may be alignment marks formed on a semiconductor wafer.

In one or more embodiments, there is provided an image acquisition device configured to acquire images of a plurality of marks, which includes a mark covered with a mask layer, from a sample on which the marks are formed, includes: a penetrative light beam-optical system configured to emit a penetrative light beam, which can penetrate a mask layer, to a measurement target mark that is one of the marks on the sample; a reflective light beam-optical system configured to emit a reflective light beam, which reflects from the mask layer, to the measurement target mark; a first detector configured to receive a first reflective light from the sample by the penetrative light beam and to transmit a first optical signal; a second detector configured to receive a second reflective light from the sample by the reflective light beam and to transmit a second optical signal; a comparer configured to determine whether the measurement target mark is covered with the mask layer by comparing the first optical signal received from the first detector and the second optical signal received from the second detector; an image acquisition light beam-optical system configured to, on the basis of a determination result by the comparer, emit a first light beam, which penetrates the mask layer, to the measurement target mark when the measurement target mark is covered with the mask layer, and emit a second light beam, which is different from the first light beam, to the measurement target mark when the measurement target mark is not covered with the mask layer; an image detector configured to create a mark image by receiving a target mark reflective light from the measurement target mark by the first light beam or the second light beam; and an imaging-optical system configured to make images in the image detector using reflective light from the plurality of marks including the target reflective mark reflective light from the measurement target mark.

The image acquisition light beam-optical device may include: a light beam source configured to generate the first light beam or the second light beam; an objective lens configured to concentrate the first light beam or the second light beam at a measurement position on the sample; and a beam splitter assembly disposed between the light beam source and the objective lens and configured to relay the first light beam or the second light beam from the light beam source to the objective lens, wherein the beam splitter assembly includes a first-light beam splitter and a second-light beam splitter and is configured to selectively place the first-light beam splitter and the second-light beam splitter on a light path between the light beam source and the objective lens based on the determination result by the comparer.

The imaging-optical device may include a mirror assembly disposed between the objective lens and the image detector, and the mirror assembly may include: a cold mirror configured to transmit a cold mirror reflective light from the sample by the first light beam and reflect the cold mirror reflective light from the sample by the reflective light beam; and a hot mirror configured to transmit a hot mirror reflective light from the sample by the second light beam and reflect the hot mirror reflective light from the sample by the penetrative light beam, and may be configured to be able to selectively place the cold mirror and the hot mirror on a light path between the objective lens and the image detector based on the determination result by the comparer.

The mirror assembly may further include a beam splitter that can be selectively placed on the light path between the objective lens and the image detector, and the beam splitter may be configured to reflect the penetrative light beam toward the objective lens and the first reflect reflective light collected at the objective lens to the first detector, and reflect the reflective light beam toward the objective lens and reflect the second reflective light collected at the objective lens to the second detector.

The image acquisition device may be used as an overlay measurement device or a wafer alignment device.

The image acquisition method and device according to the present disclosure can acquire clear images of marks in a semiconductor process including both of a layer having low visible light transmittance and high short wavelength infrared (SWIR) transmittance and a layer having high visible light transmittance.

BRIEF DESCRIPTION OF THE DRAWINGS

The above and other objectives, features and other advantages of the present disclosure will be more clearly understood from the following detailed description when taken in conjunction with the accompanying drawings, in which.

DETAILED DESCRIPTION

Hereinafter, embodiments of the present disclosure are described in detail with reference to the accompanying drawings. However, embodiments of the present disclosure may be modified in various other ways and the scope of the present disclosure should not be construed as being limited to the embodiments to be described below. Embodiments of the present disclosure are provided to more completely explain the present disclosure to those skilled in the art. Accordingly, the shapes, etc. of components in the drawings are exaggerated to emphasize clearer description and components indicated by the same symbols in the drawings are the same components.

Figure 1:
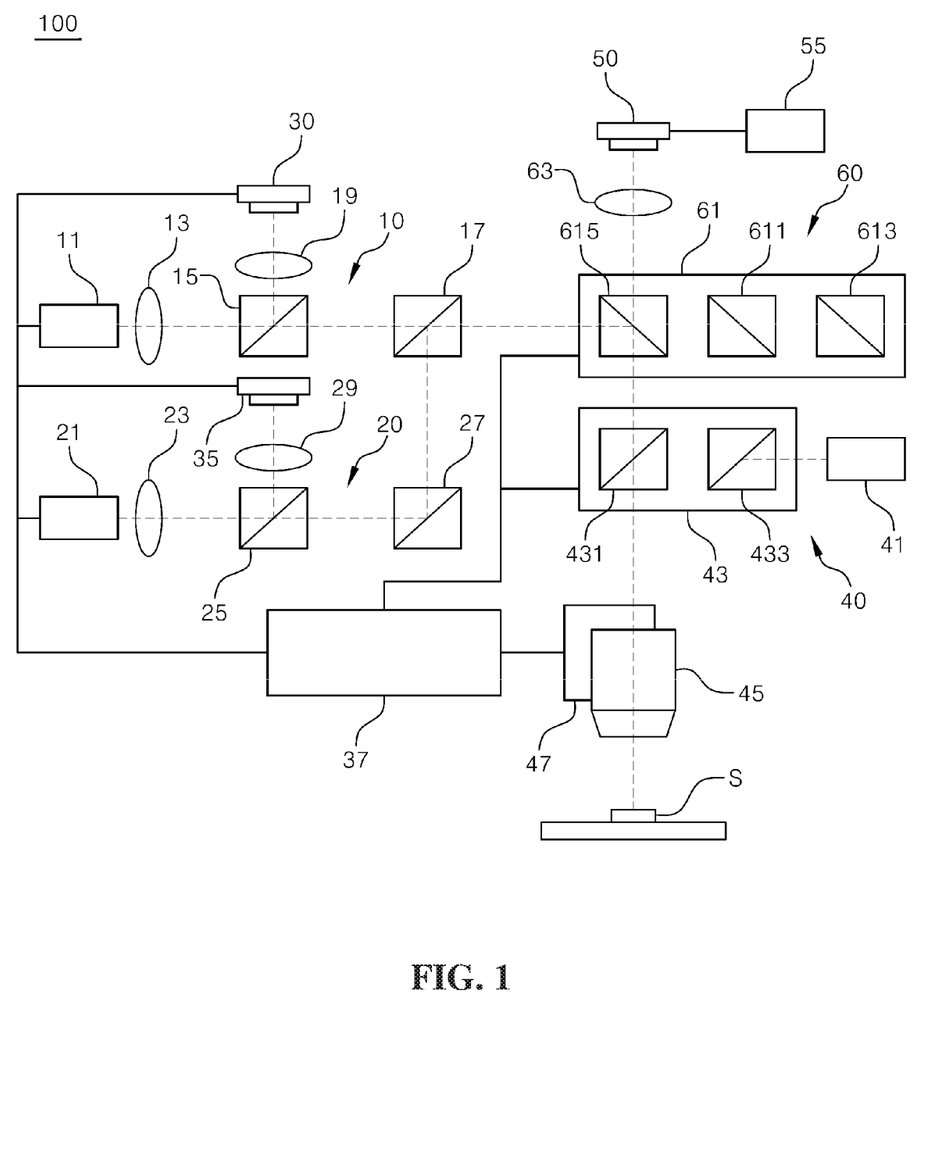
FIG. 1 is a conceptual view of an image acquisition device according to an embodiment of the present disclosure.

FIG. 1 is a conceptual view of an image acquisition device according to an embodiment of the present disclosure. As shown in FIG. 1, an image acquisition device 100 according to an embodiment of the present disclosure includes a penetrative light beam-optical system 10, a reflective light beam-optical system 20, a first detector 30, a second detector 35, a comparer 37, an image acquisition light beam-optical system 40, an image detector 50, and an imaging-optical system 60.

The image acquisition device 100 according to the present disclosure may be used as an overlay measurement device that is used for interlayer overlay error measurement of a sample S including an overlay mark covered with a layer (hereafter, a 'mask layer') having low transmittance for visible light and near infrared and high transmittance for short wavelength infrared (SWIR) or an overlay partially formed on a mask layer. The mask layer may be a silicon layer or a carbon layer.

The image acquisition device 100 according to the present disclosure may be used also as an alignment mark detection device that is installed in an exposure apparatus and detects an alignment mark formed on a wafer or a wafer alignment device.

In a first exemplary embodiment, the image acquisition device 100 is used as an overlay measurement device is described. In this exemplary embodiment, the mark that is a measurement target is an overlay mark.

Figure 2:
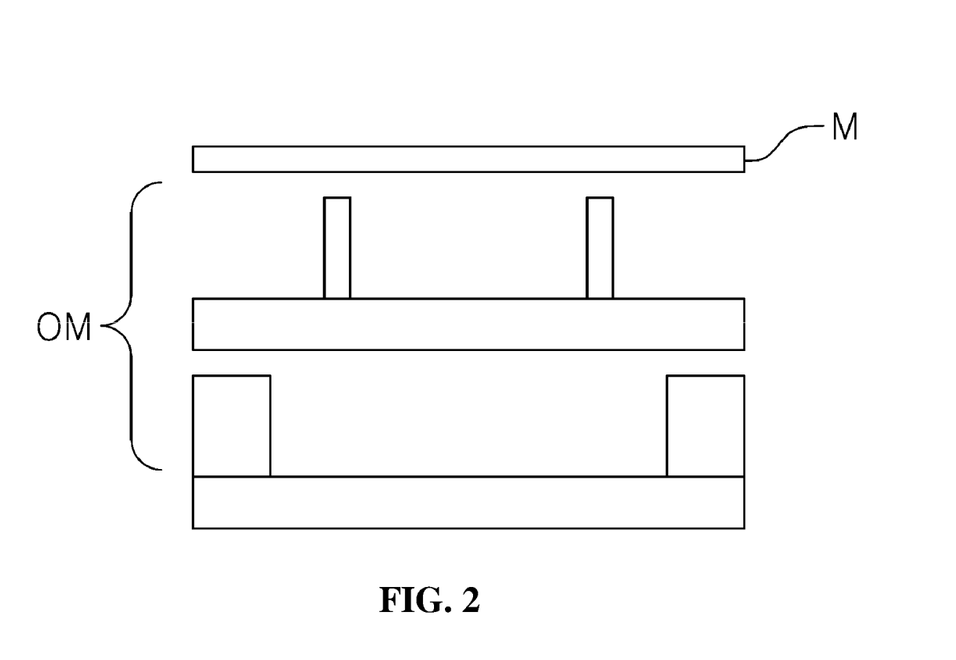
FIG. 2 is a side view of an overlay mark covered with a mask layer.
Figure 3:
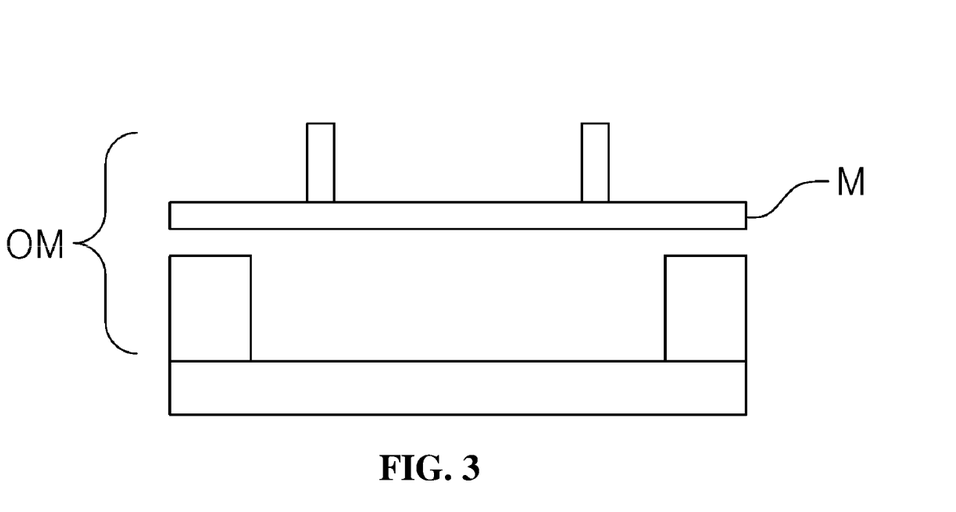
FIG. 3 is a side view of an overlay mark partially formed with a mask layer.

FIG. 2 is a side view of an overlay mark OM covered with a mask layer M. FIG. 3 is a side view of an overlay mark OM partially formed with a mask layer M. The overlay marks OM shown in FIGS. 2 and 3 are examples of overlay marks that are included in a sample S that is measured by the image acquisition device 100 according to the present disclosure. Though not shown, a plurality of different layers and overlay marks formed with the layers may be included in the sample S. Many of overlay marks may have high visible light transmittance and may not be covered with a mask layer M.

As shown in FIG. 2, when a mask layer M covers an overlay mark OM, it is difficult to acquire an overlay mark OM image using visible light and near infrared, so it is difficult to acquire an overlay mark image.

As shown in FIG. 3, also when a portion of an overlay mark OM is formed on an upper mask layer M, it is difficult to acquire an image of a structure formed with a lower layer of the overlay mark OM using visible light and near infrared.

The image acquisition device 100 according to an embodiment of the present disclosure checks (determines or detects) whether an overlay mark that is a measurement target is an overlay mark covered with a mask layer. The image acquisition device 100 selects light and optical elements to be used for image acquisition based on detecting (determining or checking) whether an overlay mark that is a measurement target is an overlay mark covered with a mask layer, thereby being able to acquire a clear overlay mark image regardless of whether there is a mask layer. The result of checking, determining, or detecting whether an overlay mark that is a measurement target is an overlay mark covered with a mask layer may be referred to as a checking result, a determination result or a detection result.

The penetrative light beam-optical system 10, the reflective light beam-optical system 20, the first detector 30, the second detector 35, and the comparer 37 are used in the process of determining whether an overlay mark that is a measurement target of overlay marks on a sample S is covered with a mask layer.

Further, the penetrative light beam-optical system 10, the reflective light beam-optical system 20, the first detector 30, and the second detector 35 are used also for autofocusing of the image acquisition device 100.

The penetrative light beam-optical system 10 serves to emit a penetrative light beam that can penetrate a mask layer to a measurement target overlay mark. The reflective light beam-optical system 20 serves to emit a reflective light beam that reflects from a mask layer to a measurement target overlay mark.

The measurement target overlay mark, which is an overlay mark formed on a sample S, may be an overlay mark at least partially covered with a mask layer or an overlay mark not covered with a mask layer.

Figure 4:
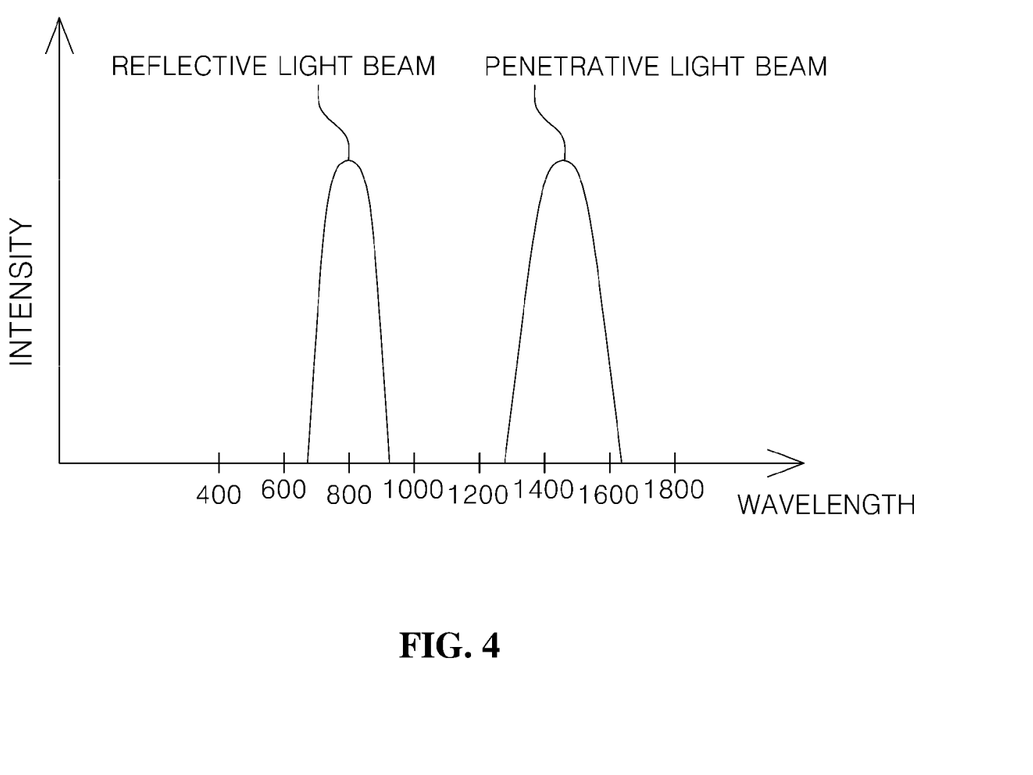
FIG. 4 is a view showing variation of intensity according to the wavelengths of a penetrative light beam and a reflective light beam.

FIG. 4 is a view showing variation of intensity according to the wavelengths of a penetrative light beam and a reflective light beam.

As shown in FIG. 4, a penetrative light beam may pertain to the wavelength band of short wavelength infrared that is longer than that of near infrared. For example, the wavelength band of the penetrative light beam may pertain to 1200~1700 nm. The reflective light beam may pertain to the wavelength bands of visible light and near infrared. For example, the wavelength band of the reflective light beam may pertain to 300~1100 nm.

The first detector 30 receives reflective light from a sample S by a penetrative light beam. The first detector 30 may be a charge-coupled device (CCD) sensor or a complementary metal-oxide semiconductor (CMOS) sensor. The second detector 35 receives reflective light from a sample S by a reflective light beam. The second detector 35 may also be a charge-coupled device (CCD) sensor or a complementary metal-oxide semiconductor (CMOS) sensor.

The comparer 37 receives and compares a first optical signal from the first detector 30 and a second optical signal from the second detector 35, thereby determining whether an overlay mark is covered with a mask layer.

Figure 5A:
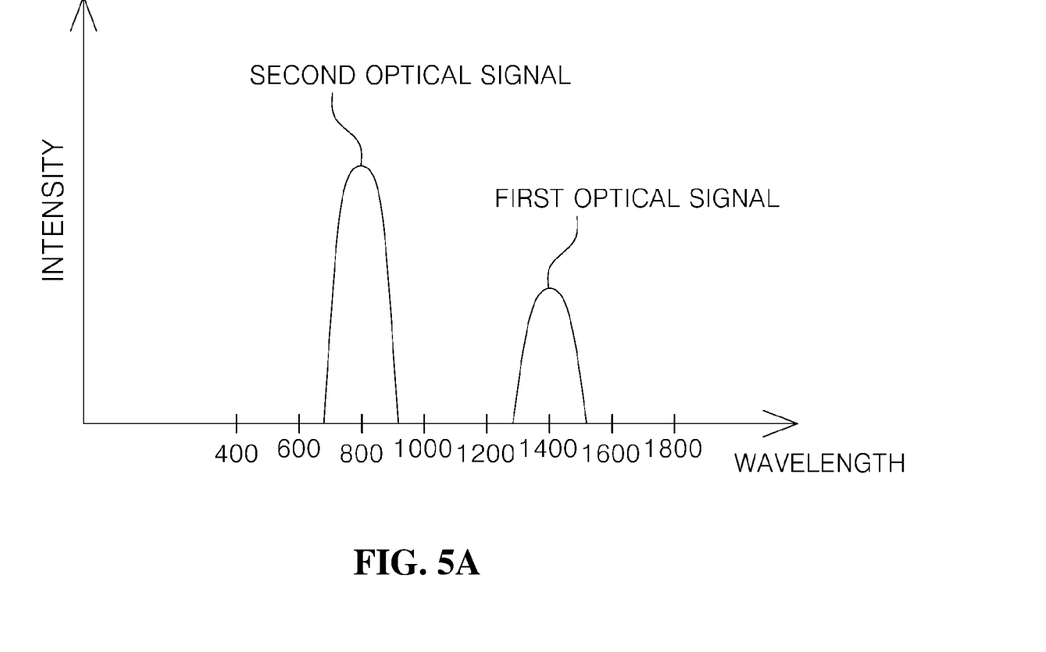
FIGS. 5A and 5B are views for explaining the operation of a comparer.
Figure 5B:
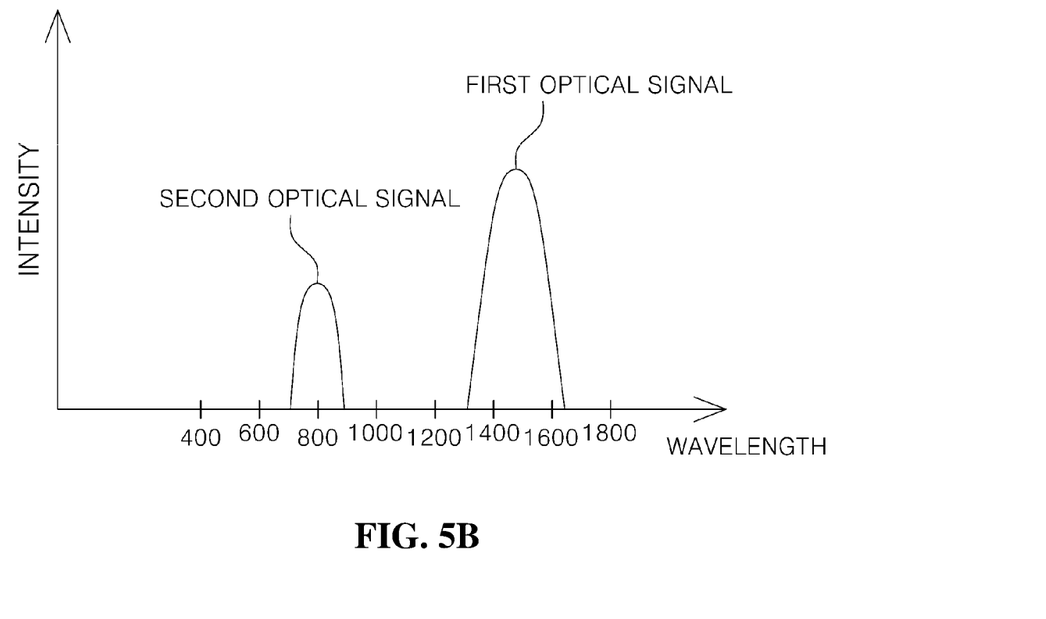

FIGS. 5A and 5B are views for explaining the operation of a comparer such as comparer 37. FIG. 5A is a graph for comparing a first optical signal and a second optical signal when an overlay mark is covered with a mask layer and FIG. 5B is a graph for comparing a first optical signal and a second optical signal when an overlay mark is not covered with a mask layer.

As can be seen in FIG. 5A, when an overlay mark is covered with a mask layer, a second optical signal has a relatively large value. This is because a reflective light beam mostly immediately reflects from a mask layer and then travels into the second detector 35. A penetrative light beam penetrates a mask layer and a loss is generated while the penetrative light beam penetrates an upper pattern layer, so it has a relatively small value.

As can be seen in FIG. 5B, when an overlay mark is not covered with a mask layer, on the contrary, a first optical signal has a relatively large value. This is because a penetrative light beam reflects from an upper pattern layer and then travels into the first detector 30. A loss is generated while the reflective light beam penetrates the upper pattern layer, so the reflective light beam has a relatively small value.

Accordingly, the comparer 37 can determine whether an overlay mark is covered with a mask layer using the ratio of a second optical signal and a first optical signal. For example, when the ratio of a second optical signal to a first optical signal is a reference value or more, it is possible to determine that an overlay mark is covered with a mask layer.

A first optical signal may be used also for autofocusing. For example, it is possible to determine that focusing would be achieved when the contrast of a first optical signal becomes the maximum. A second optical signal may also be used also for autofocusing. For example, it is possible to determine that focusing would be achieved when the contrast of a second optical signal becomes the maximum. When an overlay mark is covered with a mask layer, a second optical signal is used for autofocusing, and when it is not, a first optical signal is used.

The penetrative light beam-optical system 10 and the reflective light beam-optical system may be configured using various optical elements.

For example, the penetrative light beam-optical system 10 may include, as shown in FIG. 1, a first light source 11, a first collimation lens 13 that makes beams from the first light source 11 parallel, a first beam splitter 15, and a first dichroic mirror 17. The penetrative light beam-optical system 10 may further include a beam splitter assembly 43, a mirror assembly 61, and an objective lens 45 that are shared with the reflective light beam-optical system 20 and the image acquisition light beam-optical system 40.

A laser diode or a light emitting diode may be used as the first light source 11. The first light source 11 can generate light of the wavelength of short wavelength infrared.

The light generated by the first light source 11 penetrates the first collimation lens 13, the first beam splitter 15, and the first dichroic mirror 17. When a laser is used as the first light source 11, a polarizing beam splitter may be used as the first beam splitter 15. This is because reduction of the amount of light in the process of reflection and penetration can be minimized.

The first dichroic mirror 17 serves to transmit only the light pertaining to the wavelength of short wavelength infrared. The light that has penetrated the first dichroic mirror 17 travels into the objective lens 45 after reflecting from the mirror assembly 61 and then penetrating the beam splitter assembly 43.

The objective lens 45 serves to concentrate a penetrative light beam at a measurement position on the surface of a sample S and collect reflective light reflecting at the measurement position. The reflective light collected at the objective lens 45 again penetrates the beam splitter assembly 43 and then reflects from the mirror assembly 61. The reflective light reflecting from the mirror assembly 61 penetrates the first dichroic mirror 17, reflects from the first beam splitter toward the first detector 30, and is then concentrated at the first detector 30 by a first focus lens 19.

The reflective light beam-optical system 20 may include, as shown in FIG. 1, a second light source 21, a second collimation lens 23 that makes beams from the second light source 21 parallel, a second beam splitter 25, and a second dichroic mirror 27. The reflective light beam-optical system 20 may further include a beam splitter assembly 43, a mirror assembly 61, and an objective lens 45 that are shared with the first dichroic mirror 17 of the penetrative light beam-optical system 10, the reflective light beam-optical system 20, and the image acquisition light beam-optical system 40.

A laser diode or a light emitting diode may be used as the second light source 21. The second light source 21 can generate light pertaining to the wavelength band of visible light or short wavelength infrared.

The light generated by the second light source 21 penetrates the second collimation lens 23 and the second beam splitter 25. Then, the light reflects from the second dichroic mirror 27 and the first dichroic mirror 17. When a laser is used as the second light source 21, a polarizing beam splitter may be used as the second beam splitter 25. This is because reduction of the amount of light in the process of reflection and penetration can be minimized.

The second dichroic mirror 27 serves to transmit only the light pertaining to the wavelength band of visible light.

The light reflecting from the second dichroic mirror 27 reflects from the first dichroic mirror 17 of the penetrative light beam-optical system 10 and then reflects again from the mirror assembly 61. Further, the light penetrates the beam splitter assembly 43 and then travels into the objective lens 45. The objective lens 45 serves to concentrate a reflective light beam at a measurement position on the surface of a sample S and collect reflective light reflecting at the measurement position.

The reflective light collected at the objective lens 45 reflects again from the mirror assembly 61 after penetrating the beam splitter assembly 43. The reflective light reflecting from the mirror assembly 61 reflects from the second beam splitter 25 toward the second detector 35 after passing through the dichroic mirrors 17 and 27, and is then concentrated at the second detector by a second focus lens 29.

The image acquisition light beam-optical system 40, the image detector 50, and the imaging-optical system 60 shown in FIG. 1 are used to acquire an overlay mark image.

The image acquisition light beam-optical system 40 serves to selectively emit a first light beam or a second light beam to an overlay mark on the basis of a determination result from the comparer 37.

When an overlay mark is covered with a mask layer, the image acquisition light beam-optical system 40 emits a first light beam that penetrates the mask layer to the overlay mark. In this case, a reflective light beam is used for autofocusing.

When an overlay mark is not covered with a mask layer, the image acquisition light beam-optical system 40 emits a second light beam to the overlay mark. In this case, a penetrative light beam is used for autofocusing.

The first light beam may be short wavelength infrared (SWIR) and the second light beam may be visible light or near infrared.

The wavelength band of the first light beam may pertain to 1200~1700 nm and the wavelength band of the second light beam may pertain to 300~1100 nm.

The image detector 50 serves to create an overlay mark image by receiving reflective light from an overlay mark by a first light beam or a second light beam. The image detector 50 may be a CCD camera or a CMOS camera.

The imaging-optical system 60 serves to make an image in the image detector 50 using reflective light from an overlay mark.

When the image acquisition device 100 is used as an overlay measurement device, the image acquisition device 100 may further include a measurer 55. The measurer 55 measures an overlay error by analyzing an overlay mark image acquired from the image detector 50.

As exemplified in FIG. 1, the image acquisition light beam-optical system 40 may further include a light beam source 41, a beam splitter assembly 43, and an objective lens 45.

The light beam source 41 can generate a first light beam or a second light beam. The light beam source 41 may include a light source that can generate light of a wide wavelength band including the wavelength bands of a first light beam and a second light beam, and replaceable optical filters. A laser diode or a light emitting diode may be used as the light source. The light beam source 41 can generate a first light beam or a second light beam by adjusting the wavelength band of light from the light source by combining the optical filters.

The beam splitter assembly 43 is disposed between the light beam source 41 and the objective lens 45 and serves to relay a first light beam or a second light beam from the light beam source 41 to the objective lens 45.

The beam splitter assembly 43 may include a first-light beam splitter 431, a second-light beam splitter 433, and a beam splitter switch (not shown) that can put (place) one of the beam splitters 431 and 433 on a light path between the light beam source 41 and the objective lens 45.

The first-light beam splitter 431 includes a dielectric multilayer film or a thin metal coating film suitable for the wavelength band of a first light beam and the second-light beam splitter 433 includes a dielectric multilayer film or a thin metal coating film suitable for the wavelength band of a second light beam.

The beam splitter switch, for example, may be a linear or rotary stage on which the first-light beam splitter 431 and the second-light beam splitter 433 are installed.

The beam splitter assembly 43 puts (places) one of the first-light beam splitter 431 and the second-light beam splitter 433 on the light path between the light beam source 41 and the objective lens 45 by operating the beam splitter switch on the basis of a determination result by the comparer 37.

The objective lens 45 serves to concentrate a first light beam or a second light beam at a measurement position on a sample S. The objective lens 45 is installed at a lens focus actuator 47. The lens focus actuator 47 is used to adjust a focus plane onto an overlay mark by adjusting the distance between the objective lens 45 and a sample S.

As shown in FIG. 1, the imaging-optical system 60 may include a mirror assembly 61 and a tube lens 63. The imaging-optical system 60 uses the objective lens 45 and the beam splitter assembly 43 of the image acquisition light beam-optical system 40.

The objective lens 45 collects light reflecting from a sample S. The light collected by the objective lens 45 penetrates the beam splitter assembly 43 and the mirror assembly 61 and is then concentrated at the image detector 50 by the tube lens 63.

The mirror assembly 61 is disposed between the objective lens 45 and the image detector 50.

The mirror assembly 61 includes a cold mirror 611, a hot mirror 613, a beam splitter 615, and a mirror switch.

Figure 6:
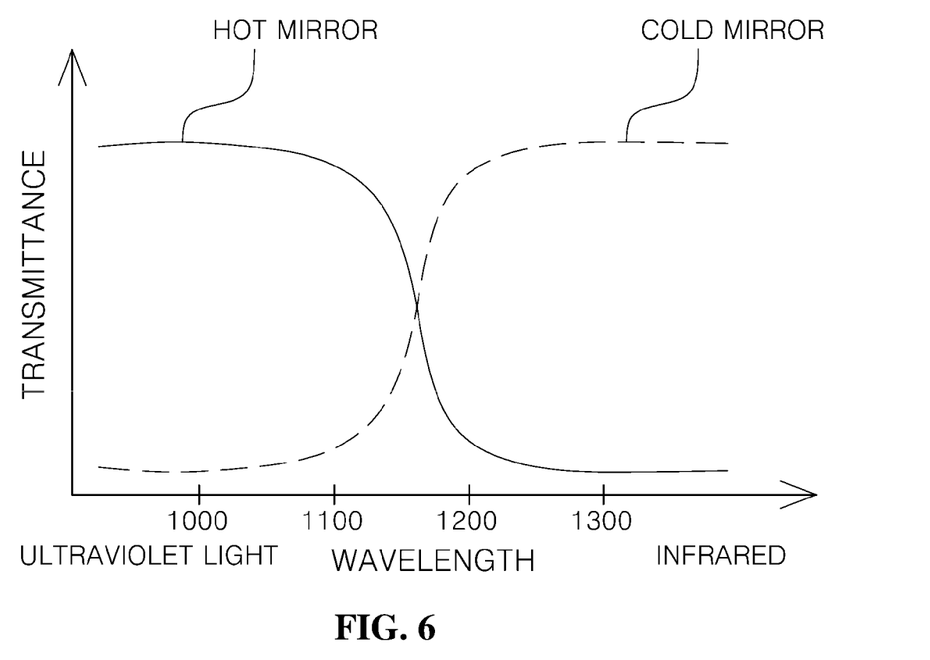
FIG. 6 is a view showing transmittance according to a wavelength of a cold mirror and a hot mirror.

FIG. 6 is a view showing transmittance according to a wavelength of a cold mirror and a hot mirror.

As shown in FIG. 6, the cold mirror 611 has high transmittance for light of long wavelengths and reflects light of short wavelengths. The cold mirror 611 transmits reflective light from a sample S by a first light beam and reflects reflective light from a sample S by a reflective light beam. Accordingly, when an overlay mark image is acquired using a first light beam and the focus is adjusted for a reflective light beam, the reflective light beam does not travel into the image detector 50 because the reflective light beam is blocked by the cold mirror 611.

The hot mirror 613 has high transmittance for light of short wavelengths and reflects light of long wavelengths. The hot mirror 613 transmits reflective light from a sample S by a second light beam and reflects reflective light from a sample S by a penetrative light beam. Accordingly, when an overlay mark image is acquired using a second light beam and the focus is adjusted for a penetrative light beam, the penetrative light beam does not travel into the image detector 50 because the penetrative light beam is blocked by the hot mirror 613.

The mirror switch serves to put (place) one of the cold mirror 611, the hot mirror 613, and the beam splitter 615 onto a light path between the image detector 50 and the objective lens 45.

The mirror switch, for example, may be a linear or rotary stage on which the cold mirror 611, the hot mirror 613, and the beam splitter 615 are installed.

The mirror assembly 61 puts (places) one of the cold mirror 611, the hot mirror 613, and the beam splitter 615 onto the light path between the objective lens 45 and the image detector 50 by operating the mirror switch on the basis of a determination result by the comparer 37.

As briefly described above, the penetrative light beam-optical system 10, the reflective light beam-optical system 20, the first detector 30, and the second detector 35 are used also for autofocusing of the image acquisition device 100.

The penetrative light beam-optical system 10 and the first detector 30 are used for autofocusing of the image acquisition device 100 when an overlay mark image is acquired by a second light beam.

For example, it is possible to determine that focusing would be achieved when the contrast of an image formed at the first detector 30 by reflective light by a penetrative light beam becomes the maximum.

The reflective light reflecting from a sample S by a penetrative light beam reflects from the mirror assembly 61 after penetrating the beam splitter assembly 43. Further, the reflective light penetrates the first dichroic mirror 17 and then reflects from the first beam splitter 15, and then makes an image at the first detector 30 through the first focus lens 19. In this case, the mirror assembly 61 puts (places) the cold mirror 611, which can reflect a penetrative light beam, on the light path.

The penetrative light beam-optical system 20 and the second detector 35 are used for autofocusing of an integrated overlay measurement device when an overlay mark image is acquired by a first light beam.

For example, it is possible to determine that focusing would be achieved when the contrast of an image formed at the second detector 35 by reflective light by a reflective light beam becomes the maximum.

The reflective light reflecting from a sample S by a reflective light reflects from the mirror assembly 61 after penetrating the beam splitter assembly 43. Further, the reflective light reflects from the second beam splitter 25 through the dichroic mirrors 17 and 27 and then makes an image at the second detector 35 through the second focus lens 29. In this case, the mirror assembly 61 puts (places) the cold mirror 611, which can reflect a reflective light beam, on the light path.

Figure 7:
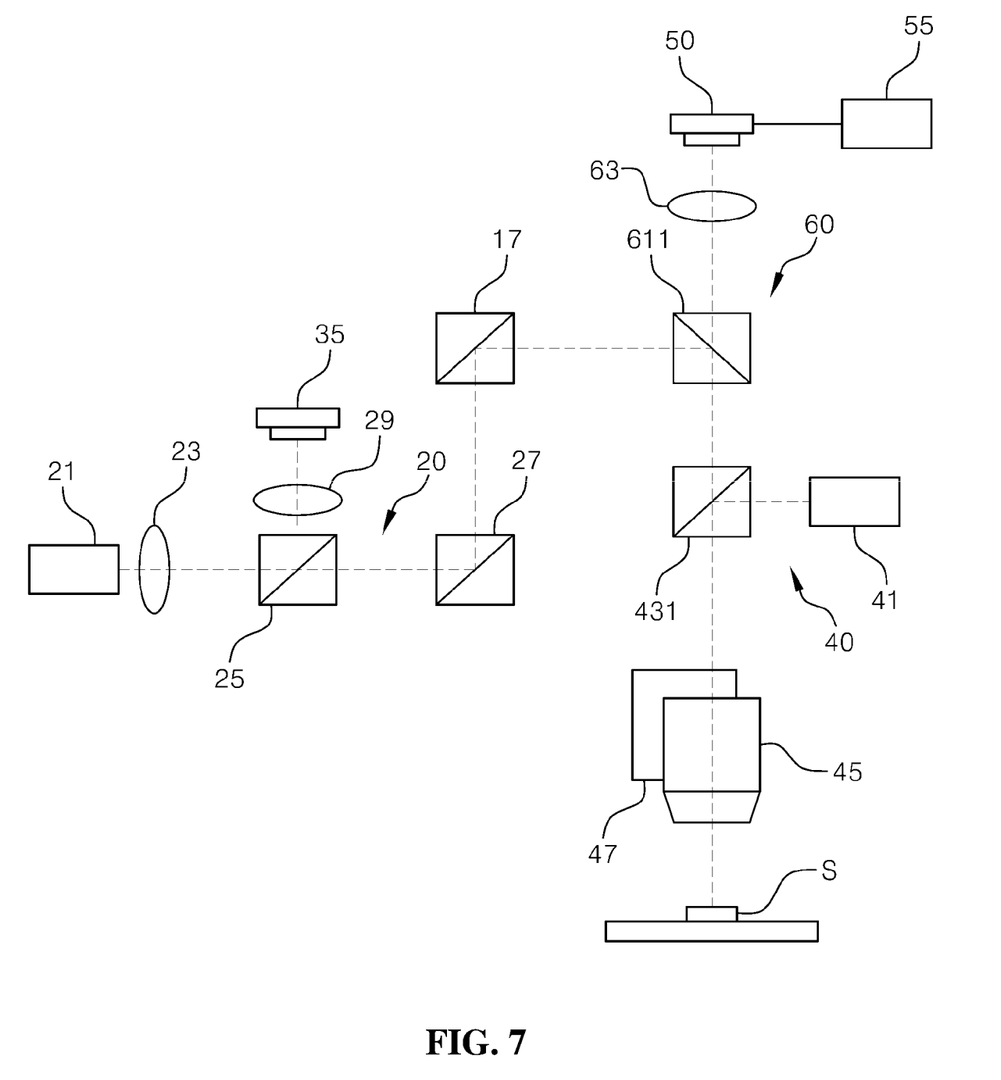
FIG. 7 is a view showing the state of the image acquisition device when an overlay mark image is acquired by a first light beam.
Figure 8:
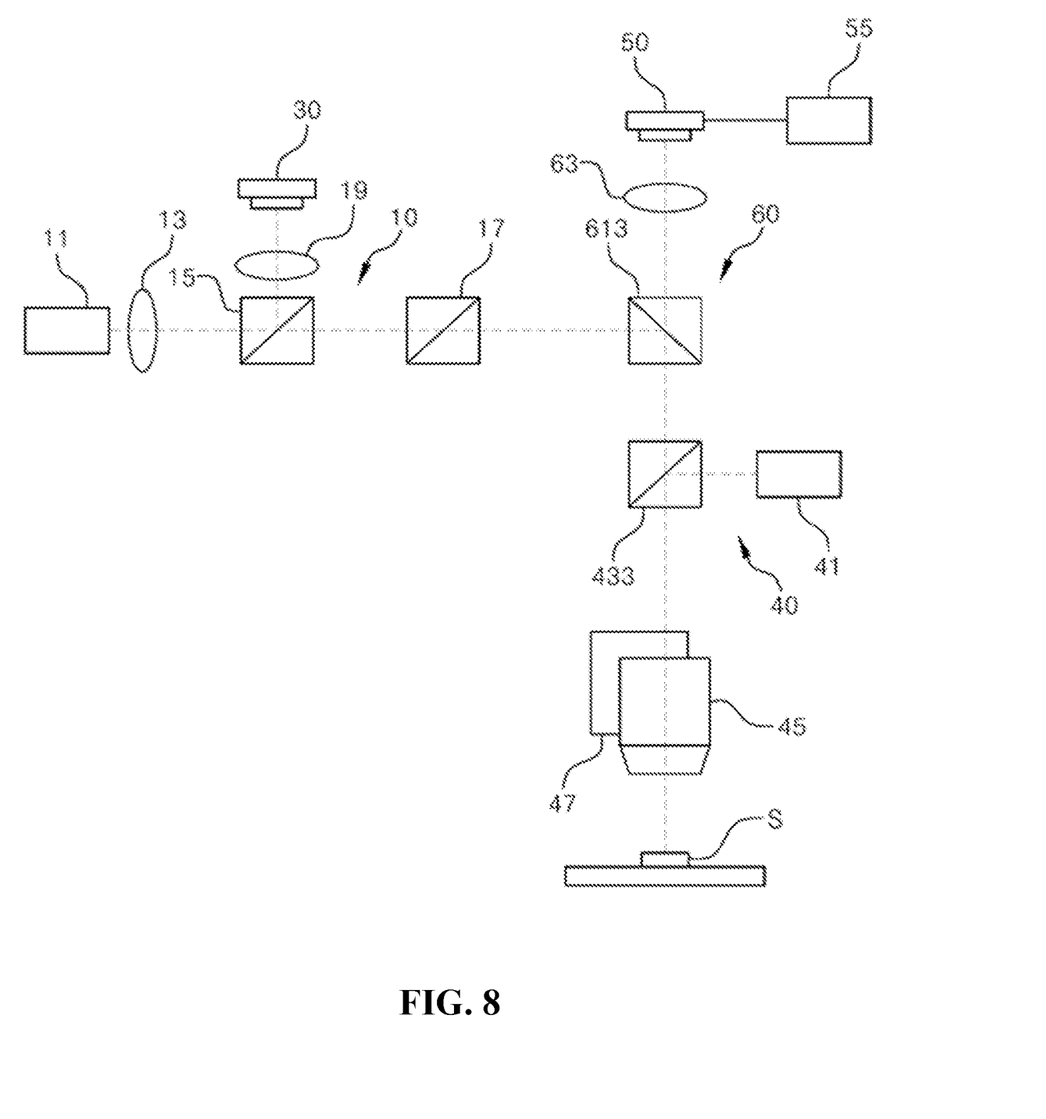
FIG. 8 is a view showing the state of the image acquisition device when an overlay mark image is acquired by a second light beam.

FIG. 7 is a view showing the state of the image acquisition device when an overlay mark image is acquired by a first light beam and FIG. 8 is a view showing the state of the image acquisition device when an overlay mark image is acquired by a second light beam.

As shown in FIG. 7, when a first light beam is used (there is a mask), the reflective light beam-optical system 20 is used for autofocusing and the mirror assembly 61 puts (places) the cold mirror 611 on the light path. Further, the beam splitter assembly 43 puts (places) the first-light beam splitter 431 on the light path.

As shown in FIG. 8, when a second light beam is used (there is no mask), the penetrative light beam-optical system 10 is used for autofocusing and the mirror assembly 61 puts (places) the hot mirror 613 on the light path. Further, the beam splitter assembly 43 puts (places) the second-light beam splitter 433 on the light path.

When the comparer 37 determines whether there is a mask, the mirror assembly 61 may put (place) the beam splitter 615, which can reflect both of a penetrative light beam and a reflective light beam, on the light path. Further, the cold mirror 611 may be used when the reflective light beam-optical system 20 is used, and the hot mirror 613 may be used when the penetrative light beam-optical system 10 is used. The beam splitter assembly 43 may use the second-light beam splitter 433 when the reflective light beam-optical system 20 is used, and may use the first-light beam splitter 431 when the penetrative light beam-optical system 10 is used.

Hereafter, an image acquisition method according to an embodiment of the present disclosure is described.

Figure 9:
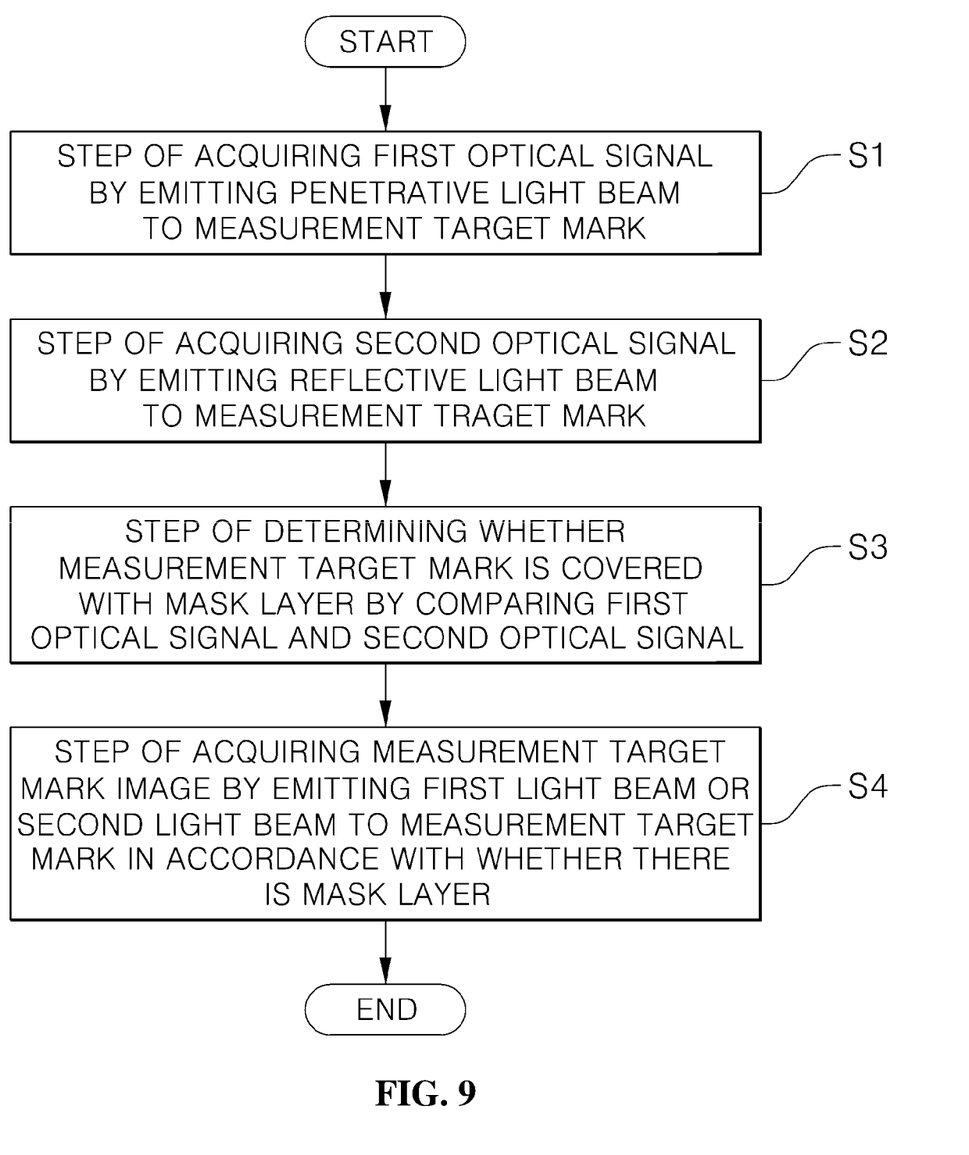
FIG. 9 is a flowchart of an image acquisition method according to an embodiment of the present disclosure.

As shown in FIG. 9, an image acquisition method according to an embodiment of the present disclosure may start with a step of acquiring a first optical signal by emitting a penetrative light beam, which can penetrate a mask layer, to a measurement target mark such as an overlay mark (S1).

In this step (S1), as described above, a penetrative light beam is emitted to the measurement target mark using the penetrative light beam-optical system 10. Further, reflective light from the measurement target mark is detected using the first detector 30, whereby a first optical signal is acquired.

Next, a second optical signal is acquired by emitting a reflective light beam, which reflects from the mask layer, to the measurement target mark (S2).

In this step, as described above, a reflective light beam is emitted to the measurement target mark using the reflective light beam-optical system 20. Further, reflective light from the measurement target mark is detected using the second detector 35, whereby a second optical signal is acquired.

Next, whether the measurement target mark is covered with a mask layer is determined by comparing the first optical signal and the second optical signal (S3).

As shown in FIG. 5A, when a measurement target mark (an overlay mark) is covered with a mask layer, the magnitude of the second optical signal may be measured as a relatively large value, as compared with when it is not so. Accordingly, it is possible to figure out whether there is a mask layer by comparing the magnitudes of a first optical signal and a second optical signal.

When it is determined that the measurement target mark is covered with a mask layer, a first light beam is selected as a light beam for acquiring a measurement target mark image. Further, a reflective light beam is selected as a light beam for autofocusing. Further, as shown in FIG. 7, a mirror and a beam splitter to be selected from the mirror assembly 61 and the beam splitter assembly 43 are correspondingly determined.

In the mirror assembly 61, the cold mirror 611 that can reflect a reflective light beam and transmit a first light beam is selected. Further, the first-light beam splitter 431 is selected in the beam splitter assembly 43.

When it is determined that the measurement target mark is not covered with a mask layer, a second light beam is selected as a light beam for acquiring a measurement target mark image. Further, a penetrative light beam is selected as a light beam for autofocusing. Further, as shown in FIG. 8, a mirror and a beam splitter to be selected from the mirror assembly 61 and the beam splitter assembly 43 are correspondingly determined.

In the mirror assembly 61, the hot mirror 613 that can reflect a penetrative light beam and transmit a second light beam is selected. Further, the second-light beam splitter 433 is selected in the beam splitter assembly 43.

Next, a measurement target mark image is acquired by emitting a first light beam or a second light beam (S4). In this step, a measurement target mark image is acquired by emitting a first light beam or a second light beam in accordance with the determination result in (S3).

When the first light beam is used, a focus is automatically adjusted using a reflective light beam. That is, the contrast of an image detected by the second detector 35 is continuously calculated, and when the contrast becomes the maximum, it is determined that focusing is achieved. Since the cold mirror 611 is selected in the mirror assembly 61 when a first light beam is used, reflective light by a reflective light beam reflects from the cold mirror 611, thereby not traveling into the image detector 50. Accordingly, image acquisition is not interfered with.

When the second light beam is used, a focus is automatically adjusted using a penetrative light beam. That is, the contrast of an image detected by the first detector 30 is continuously calculated, and when the contrast becomes the maximum, it is determined that focusing is achieved. Since the hot mirror 613 is selected in the mirror assembly 61 when a second light beam is used, reflective light by a penetrative light beam reflects from the hot mirror 613, thereby not traveling into the image detector 50. Accordingly, image acquisition is not interfered with.

Figure 10:
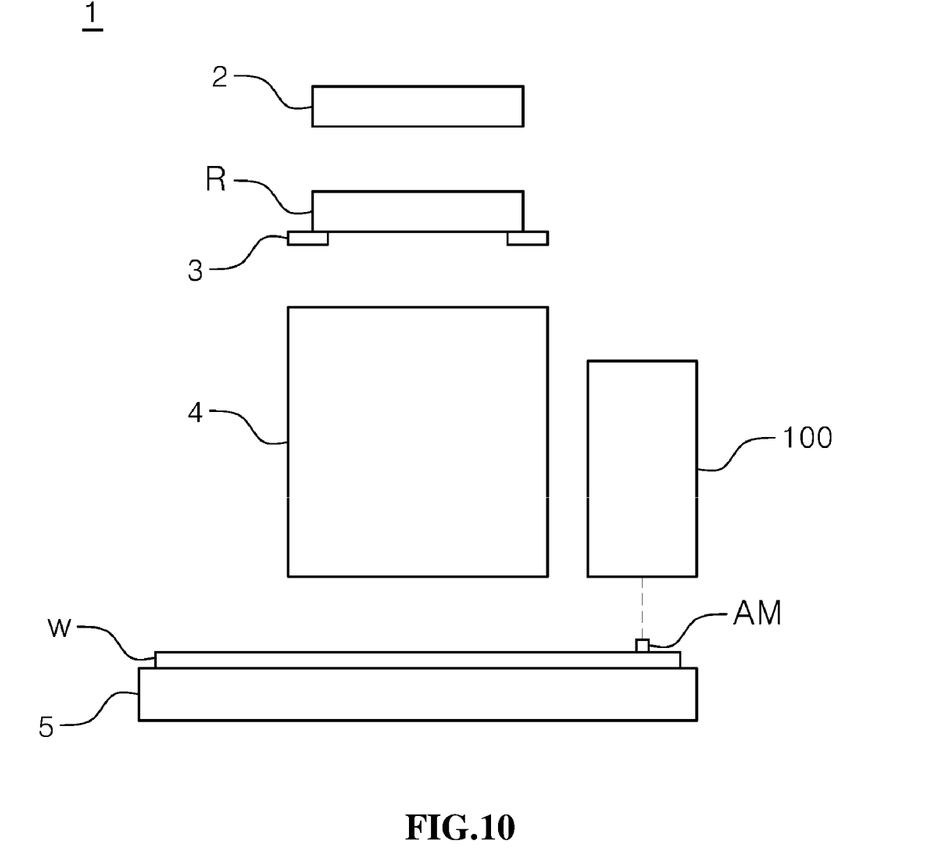
FIG. 10 is a conceptual view of an exposure apparatus including the image acquisition device according to an embodiment of the present disclosure.

FIG. 10 is a conceptual view of an exposure apparatus including the image acquisition device according to an embodiment of the present disclosure.

As shown in FIG. 10, an exposure apparatus 1 includes a lighting system 2, a reticle stage 3, a projective optical system 4, and a wafer stage 5. The lighting system 2 irradiates a reticle R by adjusting light emitted from a light source. The reticle stage 3 serves to support and move the reticle R in X and Y directions. The projective optical system 4 projects the light, which has passed through the reticle R, onto a wafer W in a predetermined magnification. The wafer stage serves to support and move the wafer W in X, Y, and Z directions.

The exposure apparatus 1 includes the image acquisition device 100. The image acquisition device 100 is used to align an irradiation region, which is irradiated with exposure light emitted from the projective optical system 4, and a pattern region that is a predetermined exposure target region on the wafer W.

The image acquisition device 100 acquires an image of an align mark AM. The exposure apparatus 1 moves the wafer W to a desired position by controlling the wafer stage 5 on the basis of the result of treating an acquired image.

The image acquisition device 100 can acquire a clear image of the align mark AM regardless of whether there is a mask layer by emitting different light beams to the align mark AM, depending on whether the align mark AM is covered with a mask layer. Accordingly, it is possible to accurately align the irradiation region and the pattern region regardless of whether there is a mask layer.

The embodiments described above are only for describing preferred embodiments of the present disclosure, the right range of the present disclosure is not limited to the embodiments described above, the embodiments may be changed and replaced in various ways by those skilled in the art within the spirit and the claims of the present disclosure, and the changed and replaced embodiments should be understood as being included in the range of the present disclosure.

What is claimed is:

1. An image acquisition method of acquiring images of a plurality of marks, which includes a mark covered with a mask layer, from a sample on which the plurality of marks are formed, the image acquisition method comprising:
 a) acquiring a first optical signal by emitting a penetrative light beam, which is capable of penetrating the mask layer, to a measurement target mark that is one of the plurality of marks on the sample;
 b) acquiring a second optical signal by emitting a reflective light beam, which reflects from the mask layer, to the measurement target mark;
 c) determining whether the measurement target mark is covered with the mask layer by comparing the first optical signal and the second optical signal; and
 d) acquiring a mark image by emitting a first light beam, which penetrates the mask layer, to the measurement target mark when the measurement target mark is covered with the mask layer, and acquiring a mark image by emitting a second light beam, which is different from the first light beam, to the measurement target mark when the measurement target mark is not covered with the mask layer, wherein the first optical signal in the step a) represents an intensity of a reflected light beam from the sample produced by the penetrative light beam and the second optical signal acquired in the step b) represents an intensity of a reflected light beam from the sample produced by the reflective light beam, and wherein when a ratio of the second optical signal to the first optical signal is a reference value or more, the measurement target mark is determined to be covered with the mask layer.

2. The image acquisition method of claim 1, wherein the mask layer is a layer that is opaque when observed through visible light or near infrared light, and wherein the mask layer is a layer that is transparent when observed through short wavelength infrared light.

3. The image acquisition method of claim 1, wherein the mask layer is a silicon layer or a carbon layer.

4. The image acquisition method of claim 1, wherein the penetrative light beam is a light beam having a wavelength outside a wavelength band of the second light beam and the reflective light beam is a light beam having a wavelength outside a wavelength band of the first light beam.

5. The image acquisition method of claim 1, wherein the first light beam is short wavelength infrared (SWIR) light.

6. The image acquisition method of claim 1, wherein the second light beam is visible light or near infrared light.

7. The image acquisition method of claim 1, wherein a wavelength band of the first light beam pertains to 1200~1700 nm.

8. The image acquisition method of claim 1, wherein a wavelength band of the second light beam pertains to 300~1100 nm.

9. The image acquisition method of claim 1, wherein:
the penetrative light beam is used as a light beam for autofocusing that is used to acquire the mark image using the second light beam, and
the reflective light beam is used as a light beam for autofocusing that is used to acquire the mark image using the first light beam.

10. The image acquisition method of claim 1, wherein the plurality of marks are overlay marks formed on a semiconductor wafer.

11. The image acquisition method of claim 1, wherein the plurality of marks are alignment marks formed on a semiconductor wafer.

12. An image acquisition device configured to acquire images of a plurality of marks, which includes a mark covered with a mask layer, from a sample on which the plurality of marks are formed, the image acquisition device comprising:
a penetrative light beam-optical system configured to emit a penetrative light beam, which is configured to penetrate the mask layer, to a measurement target mark that is one of the plurality of marks on the sample;
a reflective light beam-optical system configured to emit a reflective light beam to the measurement target mark;
a first detector configured to receive a reflected light beam from the sample produced by the penetrative light beam and to transmit a first optical signal;
a second detector configured to receive a reflected light beam from the sample produced by the reflective light beam and to transmit a second optical signal;
a comparer configured to determine whether the measurement target mark is covered with the mask layer by comparing the first optical signal received from the first detector and the second optical signal received from the second detector;
an image acquisition light beam-optical system configured to, on the basis of a determination result by the comparer, emit a first light beam, which penetrates the mask layer, to the measurement target mark when the measurement target mark is covered with the mask layer, and emit a second light beam, which is different from the first light beam, to the measurement target mark when the measurement target mark is not covered with the mask layer;
an image detector configured to create a mark image by receiving a reflected light beam from the measurement target mark produced by the first light beam or the second light beam; and
an imaging-optical system configured to make images in the image detector using the reflected light beam from the measurement target mark,
wherein the first optical signal represents an intensity of the reflected light beam produced by the penetrative light beam and the second optical signal represents an intensity of the reflected light beam produced by the reflective light beam, and
wherein when a ratio of the second optical signal to the first optical signal is a reference value or more, the measurement target mark is determined to be covered with the mask layer.

13. The image acquisition device of claim 12, wherein the image acquisition light beam-optical system comprises:
a light beam source configured to generate the first light beam or the second light beam;
an objective lens configured to concentrate the first light beam or the second light beam at a measurement position on the sample; and
a beam splitter assembly disposed between the light beam source and the objective lens and configured to relay the first light beam or the second light beam from the light beam source to the objective lens,
wherein the beam splitter assembly comprises a first-light beam splitter and a second-light beam splitter and is configured to selectively place the first-light beam splitter and the second-light beam splitter on a light path between the light beam source and the objective lens based on the determination result by the comparer.

14. The image acquisition device of claim 13, wherein the imaging-optical system comprises a mirror assembly disposed between the objective lens and the image detector, and the mirror assembly comprises:
a cold mirror configured to transmit a reflected light beam from the sample produced by the first light beam and reflect the reflected light beam from the sample produced by the reflective light beam; and
a hot mirror configured to transmit a reflected light beam from the sample produced by the second light beam and reflect the reflected light beam from the sample produced by the penetrative light beam, and
the mirror assembly is configured to be able to selectively place the cold mirror and the hot mirror on a light path between the objective lens and the image detector based on the determination result by the comparer.

15. The image acquisition device of claim 14, wherein the mirror assembly further comprises a beam splitter that can be selectively placed on the light path between the objective lens and the image detector, and
the beam splitter is configured to direct the penetrative light beam toward the objective lens and direct the reflected light beam produced by the penetrative light beam and collected at the objective lens to the first detector, and direct the reflective light beam toward the objective lens and direct the reflected light beam produced by the reflective light beam and collected at the objective lens to the second detector.

16. The image acquisition device of claim 12, wherein the image acquisition device is an overlay measurement device or a wafer alignment device.

17. The image acquisition device of claim 12, wherein a wavelength band of the first light beam pertains to 1200~1700 nm.

18. The image acquisition device of claim 12, wherein a wavelength band of the second light beam pertains to 300~1100 nm.

* * * * *